(12) United States Patent
Chen

(10) Patent No.: US 11,150,767 B2
(45) Date of Patent: Oct. 19, 2021

(54) ELECTRONIC DEVICE

(71) Applicant: BEIJING XIAOMI MOBILE SOFTWARE CO., LTD., Beijing (CN)

(72) Inventor: Chaoxi Chen, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 16/698,243

(22) Filed: Nov. 27, 2019

(65) Prior Publication Data
US 2020/0387262 A1 Dec. 10, 2020

(30) Foreign Application Priority Data

Jun. 5, 2019 (CN) .......... 201910487543.3

(51) Int. Cl.
*F21V 7/04* (2006.01)
*G06F 3/042* (2006.01)
*G06F 1/16* (2006.01)
*G06F 1/3203* (2019.01)

(52) U.S. Cl.
CPC .......... *G06F 3/0421* (2013.01); *G06F 1/1616* (2013.01); *G06F 1/1684* (2013.01); *G06F 1/3203* (2013.01)

(58) Field of Classification Search
CPC .... G06F 3/0421; G06F 1/1684; G06F 1/1616; G06F 1/3203; G06F 21/32; G06F 16/5838; G06F 3/013; G06F 1/3231; G06F 3/017; G06F 3/044; G06K 9/00013; G06K 9/2027; G06K 9/00107; G06K 9/00604; G06K 9/00892; G06K 9/0002; G06K 9/2018;

(Continued)

(56) References Cited

U.S. PATENT DOCUMENTS

2017/0119307 A1* 5/2017 Shim .................. A61B 8/04
2017/0212613 A1* 7/2017 Hwang ................ G06F 1/1686
2018/0260060 A1* 9/2018 Zhang .................. G06F 3/0412
(Continued)

FOREIGN PATENT DOCUMENTS

CN 108462769 A 8/2018
CN 108540595 A 9/2018
(Continued)

OTHER PUBLICATIONS

Extended European Search Report dated Oct. 7, 2020 in European Patent Application No. 20170331.1, 10 pages.
(Continued)

*Primary Examiner* — William J Carter
*Assistant Examiner* — Omar Rojas Cadima
(74) *Attorney, Agent, or Firm* — Oblon, McClelland, Maier & Neustadt, L.L.P.

(57) ABSTRACT

The present disclosure relates to an electronic device. The electronic device includes a device body, a screen, and a photo-sensing module. The preset light-transmissive area is provided between the screen and a side casing of the device body. A light emitter of the photo-sensing module is mounted at an edge position of the device body and corresponds to the preset light-transmissive area, and the light emitter can emit a light through the preset light-transmissive area towards a sensing space corresponding to a front side of the device body for sensing.

14 Claims, 4 Drawing Sheets

(58) Field of Classification Search
CPC ......... H04M 2250/12; H04M 1/72454; H04M 1/026
See application file for complete search history.

(56) References Cited

U.S. PATENT DOCUMENTS

2019/0041904 A1* 2/2019 Fletcher .................. G06F 3/013
2019/0180070 A1* 6/2019 Chen .................... G06K 9/0004

FOREIGN PATENT DOCUMENTS

| CN | 108540600 A | 9/2018 |
|----|-------------|--------|
| CN | 108600419 A | 9/2018 |
| CN | 108769296 A | 11/2018 |
| CN | 109274787 A | 1/2019 |
| CN | 208386629 U | 1/2019 |
| WO | 2017/075005 A1 | 5/2017 |

OTHER PUBLICATIONS

Chinese Office Action dated Jun. 25, 2021 in Chinese Application No. 201910487543.3 with English translation, 13 pages.

* cited by examiner

ELECTRONIC DEVICE

CROSS-REFERENCE TO RELATED APPLICATIONS

This application is based upon and claims priority to Chinese Patent Application Serial No. 201910487543.3, filed on Jun. 5, 2019, the entire contents of which are incorporated herein by reference.

TECHNICAL FIELD

The present disclosure generally relates to the field of electronic technologies, and more particularly, to an electronic device.

BACKGROUND

In the related art, a size of a non-display area of a front surface of an electronic device is usually reduced, and a light-transmissive hole cooperating with a photosensor is defined in the non-display area or a light-transmissive area matching a size of the photosensor is arranged on a screen, in order to raise a screen-to-body ratio of the electronic device, such as a mobile phone. However, a display effect of the screen and an aesthetic appearance of the whole device are still affected by the non-display area with reduced size, and the display effect of the screen is reduced with the light-transmissive area on the screen. Therefore, arrangement of the photosensor for the electronic device with a raised screen-to-body ratio thereof has become a hot issue in the current field.

SUMMARY

The present disclosure provides an electronic device to raise the screen-to-body ratio of the electronic device and improve the display effect of the screen.

Embodiments of the present disclosure provide an electronic device, including: a device body, a screen, and a photo-sensing module; a preset light-transmissive area being provided between the screen and a side casing of the device body; the photo-sensing module including a light emitter, a light receiver, an emitting circuit, and a receiving circuit, the emitting circuit being electrically coupled with the light emitter, the receiving circuit being electrically coupled with the light receiver, the light emitter being mounted at an edge position of the device body and corresponding to the preset light-transmissive area, an emitted light from the light emitter going out through the preset light-transmissive area and entering a sensing space corresponding to a front side of the device body.

It is to be understood that both the foregoing general description and the following detailed description are exemplary and explanatory only and are not restrictive of the present disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

Figure 1:
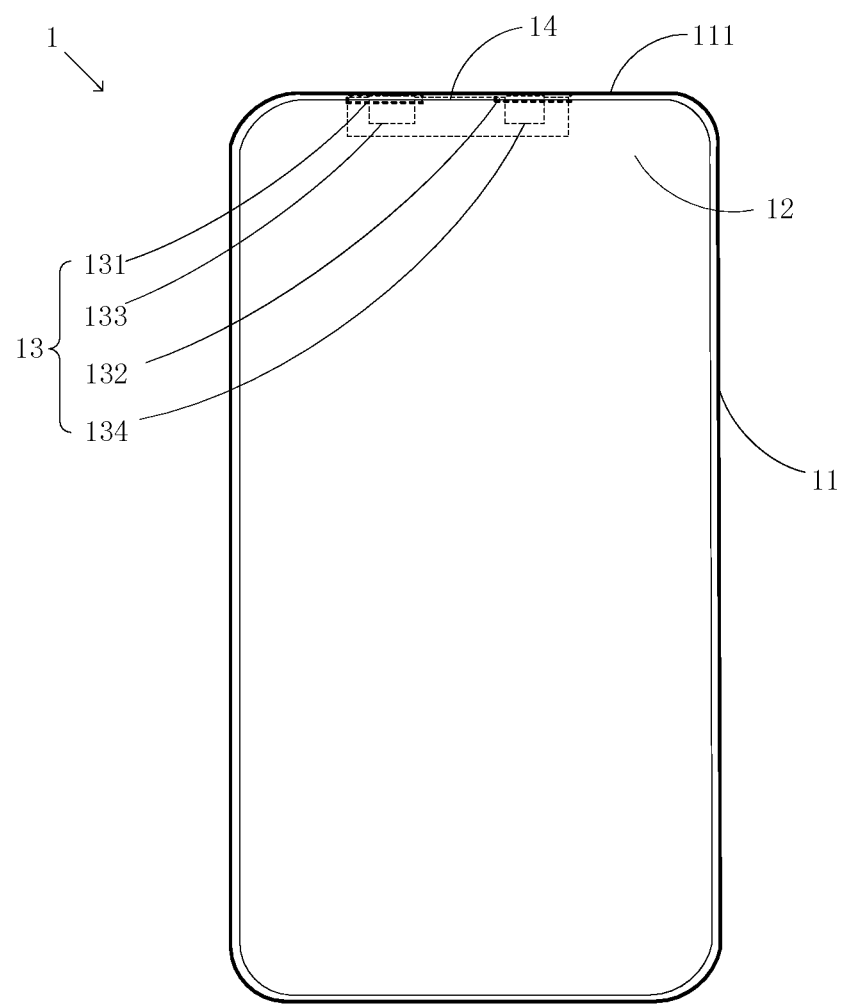
FIG. 1 is a schematic diagram of an electronic device according to an exemplary embodiment of the present disclosure.

Exemplary embodiments of the present disclosure will be described in detail and examples of the embodiments will be illustrated in the drawings. When the following description refers to the drawings, unless specified otherwise, the same numbers in different drawings represent the same or similar elements. The implementations described in the following exemplary embodiments do not represent all implementations consistent with the present disclosure, and instead they are merely examples of devices and methods consistent with aspects of the present disclosure as detailed in the appended claims.

In the related art, a size of a non-display area of a front surface of an electronic device is usually reduced, and a light-transmissive hole cooperating with a photosensor is defined in the non-display area or a light-transmissive area matching a size of the photosensor is arranged on a screen, in order to raise a screen-to-body ratio of the electronic device, such as a mobile phone. However, a display effect of the screen and an aesthetic appearance of the whole device are still affected due to the existing non-display area even if the size is reduced. The display effect of the screen is reduced with the light-transmissive area, since light is emitted perpendicularly to the light-transmissive area on the screen.

FIG. 1 is a schematic diagram of an electronic device according to an exemplary embodiment of the present disclosure. As illustrated in FIG. 1, the electronic device 1 includes a device body 11, a screen 12 and a photo-sensing module 13. A preset light-transmissive area 14 is provided between the screen 12 and a side casing 111 of the device body 11. The photo-sensing module 13 includes a light emitter 131, a light receiver 132, an emitting circuit 133, and a receiving circuit 134. The light emitter 131 is mounted at an edge position of the device body 11 and corresponds to the preset light-transmissive area 14. The light emitter 131 emits a light, the light can go out through the preset light-transmissive area 14 and enters a sensing space corresponding to a front side of the device body, so as to implement detection of an obstacle approaching the front side of the device body. The emitting circuit 133 is electrically coupled with the light emitter 131 to control operation of the light emitter 131. The receiving circuit 134 is electrically coupled with the light receiver 132 to control operation of the light receiver 132.

The screen 12 can cover a part area of the front side of the device body, or cover the whole front side of the device body 11 to exhibit a full-screen display effect. Alternatively, the screen 12 can be a special screen, such as a foldable screen, a curve screen, etc., which is not limited herein.

Corresponding to the type of the screen, the side casing 111 of the device body 11 is a casing of the device body 11 which is fitted with the screen 12 and mounted together with the screen 12. For example, when the screen 12 is a full screen covering the front side of the device body, the side casing 111 of the device body 11 corresponds to a side position of the device body 11, thus the preset light-transmissive area 14 directly faces the front side of the device body, such that light emitted from the light emitter 131 directly faces the sensing space corresponding to the front side of the device body. When the screen 12 is a curve screen, and an edge of the curve screen is bent towards a side of the device body 11, the side casing 111 of the device body 11 is a casing which is fitted with the edge of the curve screen and corresponds to the side position of the device body 11. The light emitter 131 and the light receiver 132 of the photo-sensing module 13 can cooperate with a structural member capable of changing a light path, such as a lens, such that a light is emitted towards the sensing space corresponding to the front side of the device body.

In addition, when the electronic device 1 is of a structure with an upper layer and a lower layer which are slidable relative to each other, and the screen 12 is arranged on the upper layer of the electronic device, the side casing 111 of the device body 11 is a side casing of an upper device body.

With the preset light-transmissive area 14 between the side casing 111 of the device body 11 and the screen 12, and the light emitter 131 of the photo-sensing module 13 at the edge position of the device body 11 and corresponding to the position of the preset light-transmissive area 14, the light emitter 131 can emit a light through the preset light-transmissive area 14 for sensing. In an aspect regarding a structure, the light emitter 131 does not cause interference on a mounting space for the screen 12. In an aspect regarding a function, the light emitted from the light emitter 131 does not cause interference on display effect of the screen 12. In addition, since the preset light-transmissive area 14 is arranged between the side casing 111 of the device body and the screen 12, improvement in structures of the screen 12 and the side casing 111 of the device body of the electronic device 1 can be reduced, and difficulties in processing and the cost are lowered.

It should be noted that, the preset light-transmissive area 14 is a hole structure of a preset shape or a structure of a light-transmissive material. The present shape of the preset light-transmissive area 14 can be an elongated stripe, a circle, an oval, etc., which is not limited herein. When the preset light-transmissive area 14 is a hole structure, it can be directly a gap defined between the side casing 111 of the device body and the screen 12 during mounting, which not only rises exitance of the emitted light and improves the sensing effect of the photo-sensing module 13, but also reduces much improvement in the structures of the screen 12 and the side casing 111 of the device body of the electronic device 1, reducing difficulties in processing and the cost. When the preset light-transmissive area 14 is a structure of a light-transmissive material, the light-transmissive material can satisfy requirements of a light-transmissive effect and improve consistency in appearance of the electronic device 1. For example, when the emitted light is an infrared light of 850 nm/940 nm, the preset light-transmissive area 14 is made from a light-transmissive material which only allows the infrared light of 850 nm/940 nm to pass through, the infrared light of 850 nm/940 nm can pass through the light-transmissive material, and it is can be ensured that the appearance of the present light-transmissive area is consist with those of other structures of the electronic device 1.

In the above embodiments, the electronic device 1 can be a mobile phone, a tablet computer, an in-vehicle device, a medical terminal, etc., which is not limited in the present disclosure. In the following, the mobile phone is taken as an example of the electronic device 1, a mounting position of the light receiver 132 and the fitting between the light receiver 132 and the device body 11 are exemplarily illustrated.

Figure 2:
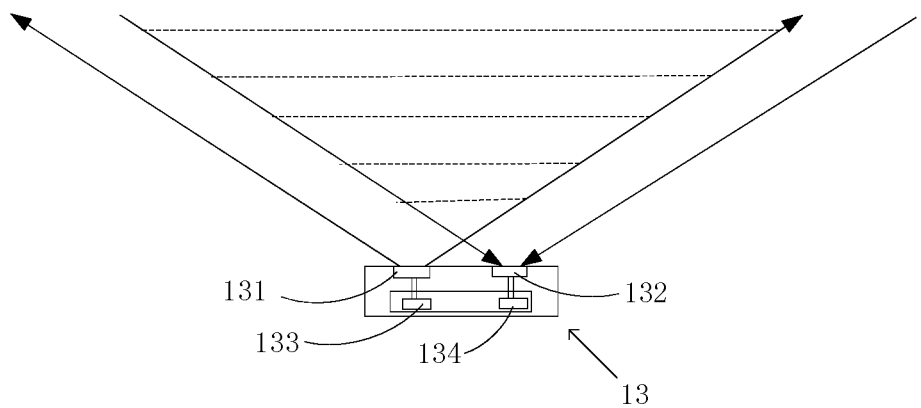
FIG. 2 is a schematic diagram of a light path of a photo-sensing module according to an exemplary embodiment of the present disclosure.

The light emitter 131 of the photo-sensing module 13 can emit an emitted light of a corresponding type. As shown in FIG. 2, a light path of the emitted light and a light path of the receiving light overlap at an overlap area depicted by dotted lines. Upon the emitted light encounters the obstacle in the overlap area, the receiving light reaches the light receiver 132 and is received by the light receiver 132.

In an embodiment, as shown in FIG. 1, both the light emitter 131 and the light receiver 132a are mounted at the edge position of the device body 11 of the mobile phone and correspond to the preset light-transmissive area 14. Both the emitted light from the light emitter 131 and the receiving light travelling towards the light receiver 132 are transmitted through the preset light-transmissive area 14, not only a transmitting effect of the emitted light and the receiving light are enhanced, but also interference on a display effect of the screen 12 caused by the light for sensing is avoided.

The preset light-transmissive area 14 can be arranged between the side casing 111 at a top portion of the device body and the screen 12, and the light emitter 131 and the light receiver 132 are mounted at the edge position of the top portion of the device body 11, such that approach of a user's face can be sensed and fed back when the user uses the mobile phone.

Specifically, when the user gets through by the mobile phone, his face approaches the front side of the device body 11, he aligns his ear with a receiver on the top portion of the mobile phone and aligns his mouth with a microphone on a bottom portion of the mobile phone. The area and probability that the light is shielded at the edge position of the top portion of the mobile phone are large based on the above usage habits, the convenience and light sensitivity of the photo-sensing module 13 can be improved with the preset light-transmissive area 14 arranged between a top side of the side casing 111 of the device body and the screen 12, and the light emitter 131 and the light receiver 132 mounted at the edge position of the top portion of the device body 11.

Alternatively, the preset light-transmissive area 14 can be arranged between the side casing 111 at a bottom portion of the device body and the screen 12, and the light emitter 131 and the light receiver 132 are mounted at the edge position of the bottom portion of the device body 11, such that approaches of different body portions of the user can be sensed according to different habits when the user uses the electronic device 1.

Figure 3:
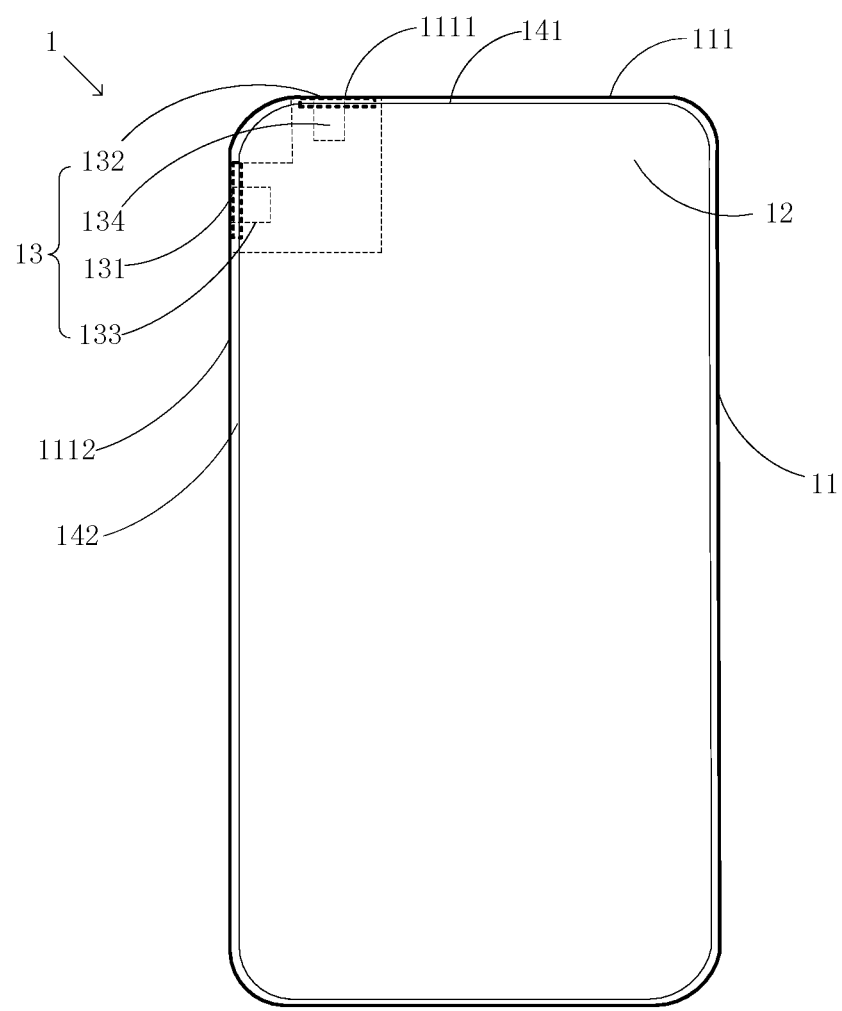
FIG. 3 is a schematic diagram of an electronic device according to another exemplary embodiment of the present disclosure.

Alternatively, as shown in FIG. 3, the preset light-transmissive area 14 includes a first area 141 between a first side wall 1111 of the side casing 111 of the device body and the screen 12, and a second area 142 between a second side wall 1112 of the side casing 111 of the device body and the screen 12, the first side wall 1111 is adjacent to the second side wall 1112, one of the light receiver 132 and the light emitter 131 corresponds to the first area 141 in position, and the other one corresponds to the second area 142 in position. The light emitter 131 and the light receiver 132 are arranged at the edge positions of two adjacent sides of the device body 11, so as to improve flexibility of arrangement of a photo-sensing assembly and optimize arrangement of the space in the electronic device 1 for mounting.

Furthermore, the first side wall 1111 or the second side wall 1112 is the side casing 111 at the top portion of the device body. For instance, the first side wall 1111 is the side casing 111 at the top portion of the device body, the second side wall 1112 is the side casing 111 at a left side of the device body and adjacent to the side casing 111 at the top portion of the device body, the first area 141 is located at a slightly upper position of the left side edge of the device body 11, the second area 142 is located at a slightly left position of the top edge of the device body 11. The light emitter 131 corresponds to the second area 142 in position, the light receiver 132 corresponds to the first area 141 in position, and the light path of the emitted light and the light path of the receiving light overlap at the overlap area. Upon the emitted light encounters the user's face in the overlap area, the receiving light reaches the light receiver 132 and is received by the light receiver 132 to achieve the sensing effect. With the preset light-transmissive area 14 at the edge positions of the top portion and the left side of the mobile phone, and the light emitter and the light receiver 132 corresponding to the two areas of the preset light-transmissive area 14, the trend of the light path and the sensing effect of the photo-sensing module 13, as well as space arrangement of structures in the electronic device 1 are optimized.

Figure 4:
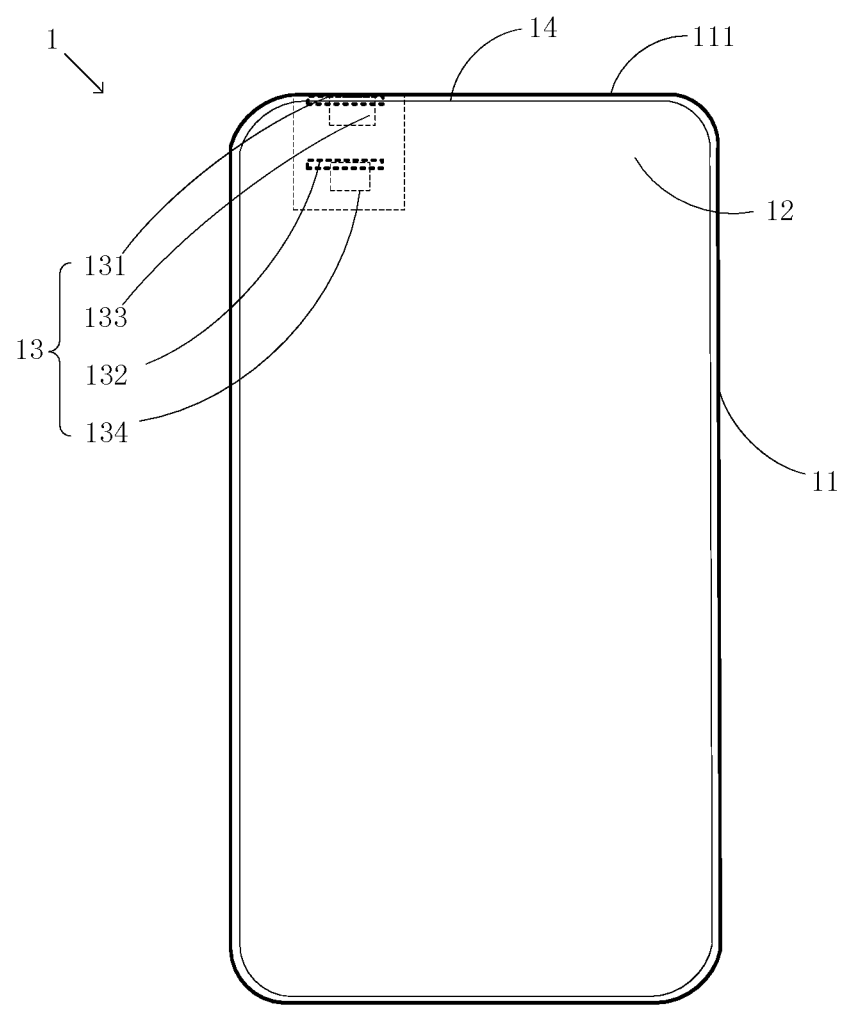
FIG. 4 is a schematic diagram of an electronic device according to still another exemplary embodiment of the present disclosure.

In another embodiment, as shown in FIG. 4, the light emitter 131 is mounted at an edge position of the device body 11 and corresponds to the preset light-transmissive area 14, and the light receiver 132 is mounted below the screen 12. The emitted light from the light emitter 131 is transmitted through the preset light-transmissive area 14, and the receiving light travelling towards the light receiver 132 is transmitted through the screen 12. On the one hand, influence on display effect of the screen 12 caused by the emitted light can be avoided, and on the other hand, space occupied by the photo-sensing module 13 in the top space of the mobile phone can be reduced, which provides more space for mounting function assemblies at the top portion of the mobile phone, such as an antenna, a camera module, etc.

Figure 5:
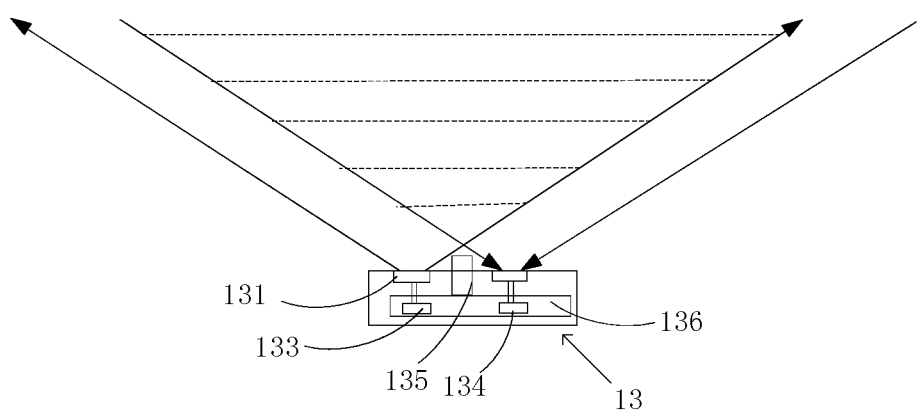
FIG. 5 is a schematic diagram of a photo-sensing module according to an exemplary embodiment of the present disclosure.

In addition, as shown in FIG. 5, the photo-sensing module 13 further includes a barrier wall 135, the barrier wall 135 is arranged between the light emitter 131 and the light receiver 132. Since the emitted light is emitted from the light emitter 131, and a reflected light can be formed after the emitted light reaches an inner side wall of the device body 11 and the screen 12, the barrier wall 135 between the light emitter 131 and the light receiver 132 can avoid a ground noise caused by the reflected light reaching the photo-sensing module 13.

The photo-sensing module 13 can implement sensing based on energy or travel time of the light, which is not limited herein. For example, the light emitter 131 can be a vertical cavity surface emitting laser (VCSEL) or an infrared light emitting diode (LED). The light receiver 132 can be a photo diode (PD) or a single photon avalanche diode (SPAD which is a photoelectric detection avalanche diode with single photon detection capacity). When the light emitter 131 is a VCSEL, the emitted light is laser light. When the light emitter 131 is the infrared light emitting diode, the emitted light is infrared light. Particularly, the infrared light can be infrared light of 850 nm/940 nm. During operation of the light emitter, a part of the emitted light reflects off a side wall of the device body 11 or other structure of the electronic device 1, in such case, the light reflected back to the photo-sensing module 13 becomes ground noise which affects the sensing effect. Because the VCSEL has a small emitting angle and concentrated emitting energy with less reflected light, the photo-sensing module 13 receives less ground noise, while the infrared light emitting diode has large emitting angle with many reflected light paths, the forming probability of ground noise is large.

Regarding the mounting position of two types of the light receiver 132, when the receiving light is received, the photo-sensing module 13 can monitor intensity or return time of the receiving light by means of the emitting circuit 133 and the receiving circuit 134, to calculate a distance between the obstacle and the electronic device 1. When the distance is smaller than a preset value, the electronic device 1 is controlled to shut down the screen to avoid touching the screen 12 by mistake and reduce power consumption.

As shown in an embodiment of FIG. 5, the emitting circuit 133 and the receiving circuit 134 can be integrated on a first control chip 136, and the first control chip 136 is mounted at an edge position of the device body 11. The emitting circuit 133 and the receiving circuit 134 integrated on the same control chip can reduce a overall size of the photo-sensing module 13, and the mounting position at the edge position of the device body 11 reduces the space in the electronic device 1 occupied by the photo-sensing module 13, and the emitting circuit 133 and the receiving circuit 134 integrated on the first control chip 136 also improve convenience in controlling the photo-sensing module 13.

Figure 6:
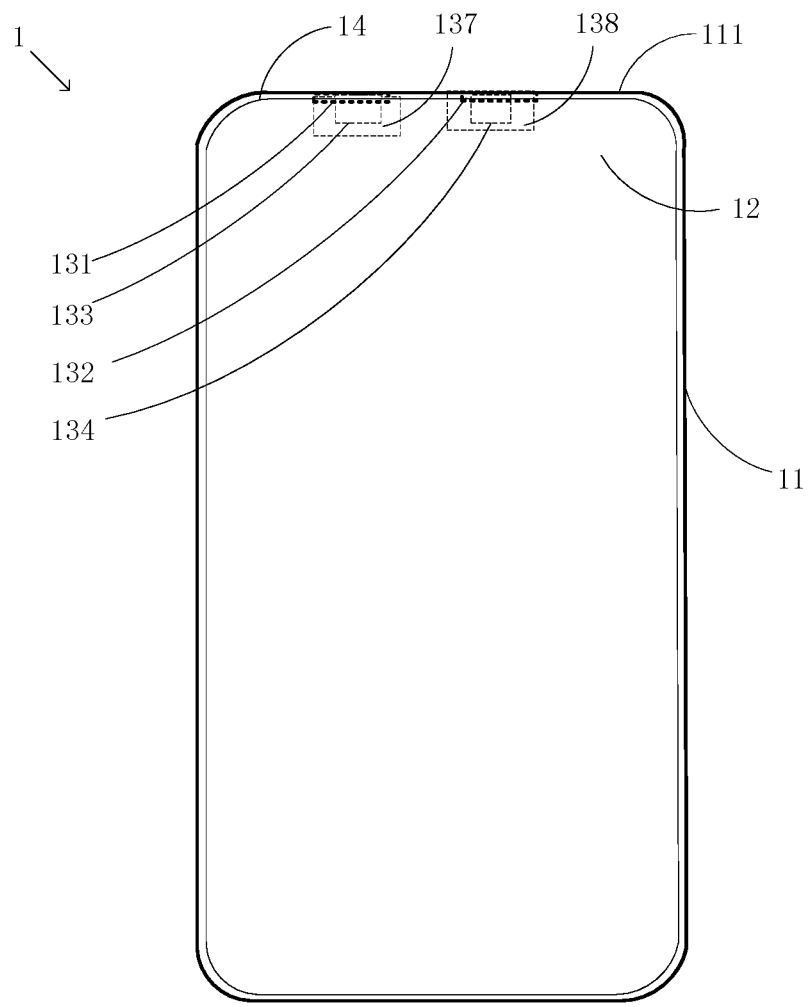
FIG. 6 is a schematic diagram of an electronic device according to yet another exemplary embodiment of the present disclosure.

In an embodiment shown in FIG. 6, the emitting circuit 133 is arranged on a second control chip 137, the receiving circuit 134 is arranged on a third control chip 138, and the second control chip 137 and the third control chip 138 are mounted at the edge position of the device body 11. The second control chip 137 corresponds to the light emitter 131 in position, and the third control chip 138 corresponds to the light receiver 132 in position. Separately arrangement of the emitting circuit 133 and the receiving circuit 134 makes it convenient for mounting and cooperation between the second control chip 137 and the light emitter 131, and between the third control chip 138 and the light receiver 132, thereby improving flexibility in mounting structures and convenience of test and maintenance of circuits.

With the preset light-transmissive area 14 between the side casing 111 of the device body 11 and the screen 12, and the light emitter 131 of the photo-sensing module 13 at the edge position of the device body 11 and corresponding to the position of the preset light-transmissive area 14, the light emitter 131 can emit a light through the preset light-transmissive area 14 for sensing. In an aspect regarding a structure, the light emitter 131 does not cause interference on a mounting space for the screen 12. In an aspect regarding a function, the light emitted from the light emitter 131 does not cause interference on display effect of the screen 12. In addition, since the preset light-transmissive area 14 is arranged between the side casing 111 of the device body and the screen 12, improvement in structures of the screen 12 and the side casing 111 of the device body of the electronic device 1 can be reduced, and difficulties in processing and the cost are lowered.

Other embodiments of the disclosure will be apparent to those skilled in the art from consideration of the specification and practice of the technical solutions disclosed here. This application is intended to cover any variations, uses, or adaptations of the disclosure following the general principles thereof and including such departures from the present disclosure as come within known or customary practice in the art. It is intended that the specification and examples are considered to be exemplary only, with a true scope and spirit of the disclosure being indicated by the following claims.

It will be appreciated that the present disclosure is not limited to the exact construction that has been described above and illustrated in the accompanying drawings, and that various modifications and changes can be made without departing from the scope thereof. The scope of the disclosure only can be limited by the appended claims.

What is claimed is:

1. An electronic device, comprising:
   a device body having a side casing;
   a screen that is mounted to the device body at a front side of the device body;
   a preset light-transmissive area that is arranged between the screen and the side casing of the device body and touches the side casing of the device body; and
   a photo-sensing module that includes a light emitter, a light receiver, an emitting circuit, and a receiving circuit, the emitting circuit being electrically coupled with the light emitter, the receiving circuit being electrically coupled with the light receiver, the light emitter being mounted at an edge of the device body and corresponding to the preset light-transmissive area, light emitted from the light emitter passing out through the preset light-transmissive area into a sensing space corresponding to the front side of the device body, the light emitter being flush with the preset light-transmissive area against the side casing of the device body.

2. The electronic device according to claim 1, wherein the light receiver is mounted at the edge of the device body.

3. The electronic device according to claim 2, wherein the preset light-transmissive area is arranged between the screen and the side casing of the device body near a top portion of the front side of the device body, and the light emitter and the light receiver are mounted at the edge of the device body near the top portion of the front side of the device body; or the preset light-transmissive area is arranged between the screen and the side casing of the device body near a bottom portion of the front side of the device, and the light emitter and the light receiver are mounted at the edge of the device body near the bottom portion of the front side of the device.

4. The electronic device according to claim 2, wherein the preset light-transmissive area comprises a first area between a first side wall of the side casing of the device body and the screen, and a second area between a second side wall of the side casing of the device body and the screen, the first side wall is adjacent to the second side wall, one of the light receiver and the light emitter corresponds to the first area in position, and the other one corresponds to the second area in position.

5. The electronic device according to claim 1, wherein the light receiver is mounted below the screen.

6. The electronic device according to claim 1, wherein the emitting circuit and the receiving circuit are integrated on a control chip, and the control chip is mounted at the edge of the device body.

7. The electronic device according to claim 1, wherein the emitting circuit is arranged on a first control chip, the receiving circuit is arranged on a second control chip, the first control chip and the second control chip are mounted at the edge of the device body, the first control chip corresponds to the light emitter in position, and the second control chip corresponds to the light receiver in position.

8. The electronic device according to claim 1, wherein the photo-sensing module further includes a barrier wall, and the barrier wall is arranged between the light emitter and the light receiver to avoid reflected light of the light emitted from the light emitter reaching the light receiver.

9. The electronic device according to claim 1, wherein the preset light-transmissive area includes a hole structure of a preset shape or a structure of a light-transmissive material.

10. The electronic device according to claim 1, wherein the preset light-transmissive area comprises a gap formed by an edge of the screen and a sidewall of the side casing of the device body.

11. The electronic device according to claim 1, wherein the light-transmissive area is adjoined between the side casing and the screen.

12. The electronic device according to claim 1, wherein the light-transmissive area touches an edge of the screen.

13. The electronic device according to claim 1, wherein the light-transmissive area touches the side casing and the screen at opposite positions of the light-transmissive area.

14. The electronic device according to claim 1, wherein the preset light-transmissive area has a shape of an elongated stripe, a circle, or an oval.

* * * * *